United States Patent
Byun

(10) Patent No.: US 11,403,015 B2
(45) Date of Patent: Aug. 2, 2022

(54) MEMORY SYSTEM AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 12 days.

(21) Appl. No.: 16/677,440

(22) Filed: Nov. 7, 2019

(65) Prior Publication Data
US 2020/0150868 A1 May 14, 2020

(30) Foreign Application Priority Data

Nov. 9, 2018 (KR) .................. 10-2018-0137523

(51) Int. Cl.
*G06F 3/06* (2006.01)
(52) U.S. Cl.
CPC ............ *G06F 3/064* (2013.01); *G06F 3/0619* (2013.01); *G06F 3/0653* (2013.01); *G06F 3/0679* (2013.01)
(58) Field of Classification Search
CPC ...... G06F 3/064; G06F 3/0653; G06F 3/0619; G06F 3/0679; G06F 2212/1016; G06F 2212/1036; G06F 2212/7211; G06F 2212/7208; G06F 12/0246; G06F 3/061; G06F 3/0614; G06F 3/0629; G06F 3/0688
See application file for complete search history.

(56) References Cited

FOREIGN PATENT DOCUMENTS

| KR | 10-2013-0061967 | 6/2013 |
| KR | 10-2016-0032910 | 3/2016 |

OTHER PUBLICATIONS

Park et al "A hybrid flash translation layer design for SLC-MLC flash memory based multibank solid state disk" Microprocessors and Microsystems p. 48-59 Retrieved from the Internet on Jan. 12, 2021 <URL: https://www.sciencedirect.com/science/article/pii/S0141933110000475?via%3Dihub> (Year: 2011).*

Micron "TN-FD-20: C400 SSD SMART Attributes" [online] Technical disclosure 2013. Retrieved on the Internet on Jan. 12, 2021 <URL: https://www.micron.com/-/media/client/global/documents/products/technical-note/solid-state-storage/tnfd20_c400_ssd_smart_attributes.pdf> (Year: 2013).*

* cited by examiner

*Primary Examiner* — David Yi
*Assistant Examiner* — Dustin B. Fulford
(74) *Attorney, Agent, or Firm* — IP & T Group LLP

(57) ABSTRACT

A memory system includes a memory device including a plurality of source dies, wherein each of the plural source dies includes a plurality of memory blocks; and a controller suitable for configuring a super block by selecting a memory block of which a maximum erasable count value is lowest in each of the plurality of dies.

21 Claims, 13 Drawing Sheets

| CHANNEL | BLOCK NUMBER | FIRST DIE | SECOND DIE | THIRD DIE | FOURTH DIE |
|---|---|---|---|---|---|
| CH1 | 1 | 1000 | 2000 | 1000 | 3000 |
|  | 2 | 2000 | 2000 | 1000 | 2000 |
|  | 3 | 3000 | 3000 | 3000 | 1000 |
|  | 4 | 2000 | 2000 | 3000 | 1000 |
|  | 5 | 1000 | 1000 | 3000 | 2000 |
|  | ⋮ | ⋮ | ⋮ | ⋮ | ⋮ |
|  | m | 3000 | 2000 | 2000 | 3000 |
| CH2 |  |  |  |  |  |
| ⋮ |  |  |  |  |  |
| CHn |  |  |  |  |  |

| CHANNEL | SB index | BLOCK NUMBER OF FIRST DIE | BLOCK NUMBER OF SECOND DIE | BLOCK NUMBER OF THIRD DIE | BLOCK NUMBER OF FOURTH DIE |
|---|---|---|---|---|---|
| CH1 | 1 | 1 | 1 | 1 | 1 |
|  | 2 | 2 | 2 | 2 | 2 |
|  | 3 | 3 | 3 | 3 | 3 |
|  | 4 | 4 | 4 | 4 | 4 |
|  | 5 | 5 | 5 | 5 | 5 |
|  | ⋮ | ⋮ | ⋮ | ⋮ | ⋮ |
|  | m | m | m | m | m |
| CH2 |  |  |  |  |  |
| ⋮ |  |  |  |  |  |
| CHn |  |  |  |  |  |

146

| CHANNEL | BLOCK NUMBER | FIRST DIE | SECOND DIE | THIRD DIE | FOURTH DIE |
|---|---|---|---|---|---|
| CH1 | 1 | 1000 | 2000 | 1000 | 3000 |
| | 2 | 2000 | 2000 | 1000 | 2000 |
| | 3 | 3000 | 3000 | 3000 | 1000 |
| | 4 | 2000 | 2000 | 3000 | 1000 |
| | 5 | 1000 | 1000 | 3000 | 2000 |

148

| CHANNEL | SB index | BLOCK NUMBER OF FIRST DIE | BLOCK NUMBER OF SECOND DIE | BLOCK NUMBER OF THIRD DIE | BLOCK NUMBER OF FOURTH DIE |
|---|---|---|---|---|---|
| CH1 | 1 | 1 | 5 | 1 | 3 |
| | 2 | 5 | 1 | 2 | 4 |
| | 3 | 2 | 2 | 3 | 5 |
| | 4 | 4 | 4 | 4 | 2 |
| | 5 | 3 | 3 | 5 | 1 |

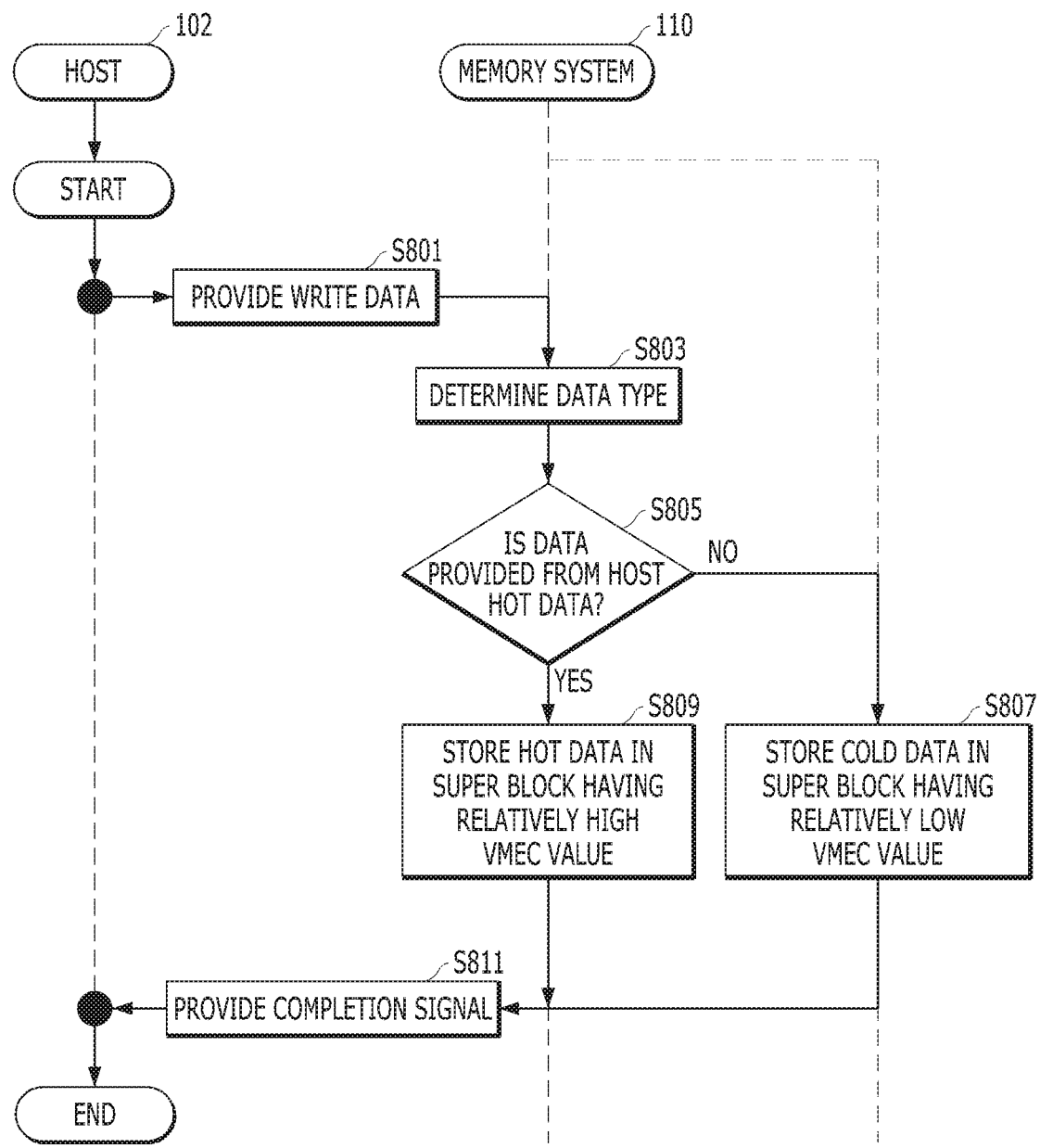

MEMORY SYSTEM AND OPERATING METHOD THEREOF

CROSS-REFERENCE TO RELATED APPLICATIONS

The present application claims priority under 35 U.S.C. § 119(a) to Korean Patent Application No. 10-2018-0137523, filed on Nov. 9, 2018, the disclosure of which is incorporated herein by reference in its entirety.

BACKGROUND

1. Field

Various embodiments of the present invention relate to a memory system. Particularly, the embodiments relate to a memory system including a non-volatile memory device and a controller, and an operating method of the memory system.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since the memory systems have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments of the present invention are directed to a memory system and an operating method of the memory system that weakens a disturbance phenomenon that may occur when sudden power-off (SPO) occurs repeatedly during a sudden power-off recovery (SPOR) operation.

In accordance with an embodiment of the present invention, a memory system includes: a memory device including a plurality of source dies, wherein each of the plural source dies includes a plurality of memory blocks; and a controller suitable for configuring a super block by selecting a memory block of which a maximum erasable count value is lowest in each of the plurality of dies.

In accordance with an embodiment of the present invention, a method for operating a memory system, the method includes: selecting a memory block of which a maximum erasable count value is lowest in each of a plurality of dies, wherein each of the plurality of dies includes a plurality of memory blocks; and configuring the super block with the selected memory blocks.

In accordance with an embodiment of the present invention, a memory system includes: plural memory devices each including plural memory blocks; and a controller configured to: configure plural super blocks each comprising partial memory blocks among the memory blocks, the partial memory blocks being respectively selected in an ascending order of variable max erase count (VMEC) values within the memory devices, each super block correspond to a smallest one among the VMEC values of the partial memory blocks configuring the super block; control the memory devices to store hot data in the super block among the super blocks, corresponding to a preferentially greater VMEC value; and control the memory devices to store cold data in the super block among the super blocks, corresponding to a preferentially smaller VMEC value.

These and other features and advantages of the present invention will become apparent to those skilled in the art of the invention from the following detailed description in conjunction with the following drawings.

BRIEF DESCRIPTION OF THE DRAWINGS

FIG. 2 is a diagram illustrating a structure of the VMEC table 146 in accordance with an embodiment of the present invention disclosure.

FIG. 3 is a diagram illustrating a structure of the SB table 148 in accordance with an embodiment of the present invention disclosure.

FIG. 8B is a flow chart of an operation process of the data processing system 100 in accordance with an embodiment of the present invention disclosure.

DETAILED DESCRIPTION

Figure 1:
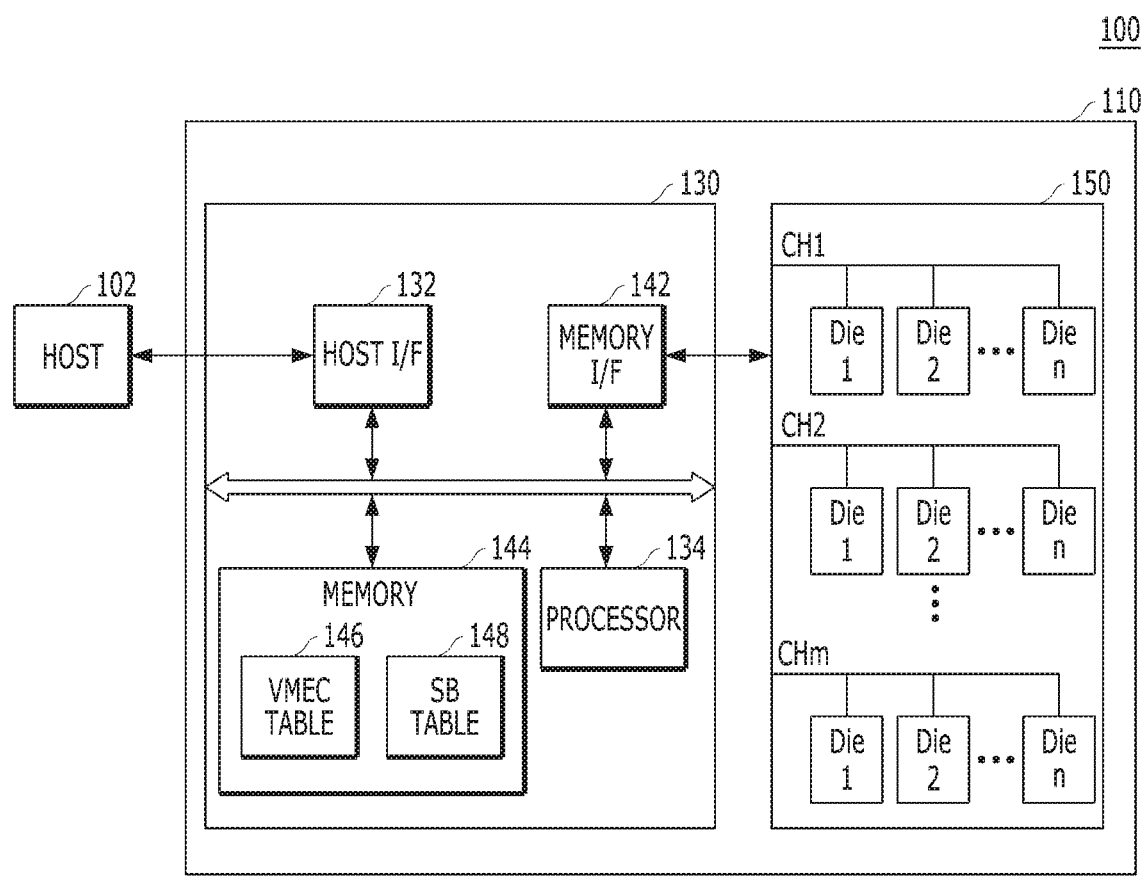
FIG. 1 is a block diagram illustrating a data processing system including a memory system in accordance with an embodiment of the present invention.

Various embodiments of the present invention are described below in more detail with reference to the accompanying drawings. However, various elements and features of the present invention may be configured or arranged differently than shown in the described embodiments, as will be apparent to those skilled in the art in light of this disclosure. Thus, the present invention is not limited to the embodiments set forth herein. Rather, the described embodiments are provided so that this disclosure is thorough and complete, and fully conveys the present invention to those skilled in the art to which this invention pertains.

Moreover, reference to "an embodiment" does not necessarily mean only one embodiment, and different references to "an embodiment" are not necessarily to the same embodiment(s). Throughout the disclosure, like reference numerals refer to like parts throughout the various figures and embodiments of the present invention.

The drawings are not necessarily to scale and, in some instances, proportions may have been exaggerated in order to clearly illustrate various features of the disclosed embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Various embodiments of the present invention will be described in detail with reference to the attached drawings.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use, purpose, and usage of a user.

The memory system 110 may operate to store data for the host 102 in response to a request of the host 102. Non-limiting examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the. The SD card may include a mini-SD card and micro-SD card.

The memory system 110 may be embodied by various types of storage devices. Examples of such storage devices may include, but are not limited to, volatile memory devices such as a DRAM dynamic random access memory (DRAM) and a static RAM (SRAM), and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150.

The controller 130 and the memory device 150 may be integrated into a single semiconductor device, which may be included in the various types of memory systems as exemplified above. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD, micro-SD and SDHC, or universal flash storage (UFS) device.

Figure 4:
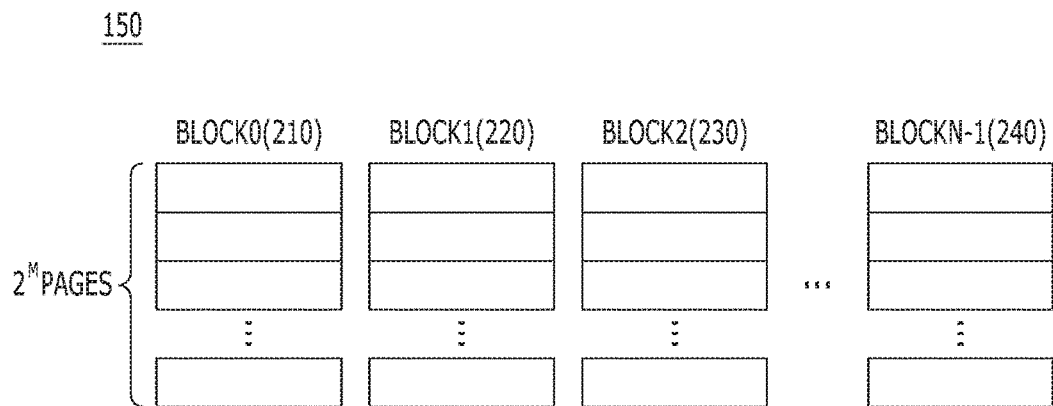
FIG. 4 is a schematic diagram illustrating a configuration of a memory device including a plurality of memory blocks employed in the memory system of FIG. 1, in accordance with an embodiment.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of dies operatively coupled to the controller 130 via a plurality of channels CH1 to CHm. As illustrated in FIG. 1, n dies may be arranged in each channel. Each die may include a plurality of memory blocks 210, 220, 230 . . . 240 (hereinafter, referred to as "memory blocks 220 to 240") each of which may include a plurality of pages, and each of the pages may include a plurality of memory cells coupled to a word line. (FIG. 4). In an embodiment, the memory device 150 may be a flash memory. The flash memory may have a 3-dimensional (3D) stack structure.

The structure of the memory device 150 including its 3D stack structure will be described in more detail later with reference to FIGS. 4 to 6.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

The controller 130 may include a host interface (I/F) 132, a processor 134, a memory interface (I/F) 142 such as a NAND flash controller (NFC), and a memory 144 all operatively coupled via an internal bus. The controller 130 may also include well-known components such as an error correction code (ECC) circuit, and a power management unit (PMU) which are not shown in FIG. 1.

The host interface 132 may be configured to process a command and data of the host 102, and may communicate with the host 102 through one or more various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The memory I/F 142 may serve as a memory/storage interface for interfacing the controller 130 and the memory device 150 such that the controller 130 controls the memory device 150 in response to a request from the host 102.

The memory 144 may serve as a working memory of the memory system 110 and the controller 130, and store data for driving the memory system 110 and the controller 130.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130. The memory 144 may include a variable max erase count (VMEC) table 146 and a super block (SB) table 148 which are described in detail below.

The processor 134 may control the general operations of the memory system 110, and in particular, a program operation or a read operation for the memory device 150, in response to a write request or a read request from the host 102. The processor 134 may drive a firmware which is referred to as a flash translation layer (FTL), to control general operations of the memory system 110. The processor 134 may be realized by a microprocessor or a central processing unit (CPU).

The processor 134 may manage a plurality of memory blocks which are included in the memory device 150. The processor 134 may configure the plurality of memory blocks as a plurality of super blocks. Each super block may be configured by predetermined memory blocks which are included in a plurality of dies, respectively. For example, when each super block may be configured by memory blocks included in first to fourth dies, the processor 134 may configure first memory blocks respectively included in the first to fourth dies, as one super block.

In particular, the processor 134 may configure super blocks based on the VMEC table 146. The processor 134 may load the VMEC table 146 stored in the memory device 150, and may store the loaded VMEC table 146 in the memory 144. The VMEC table 146 will be described below with reference to FIG. 2.

FIG. 2 is a diagram illustrating a structure of the VMEC table 146 in accordance with an embodiment of the present invention disclosure. In FIG. 2, first to fourth dies are coupled to each of a plurality of channels. Each die includes first to m^th memory blocks. Further, it is assumed that a VMEC value may include 1000, 2000 or 3000. It is noted that these values are used as an example, and that the disclosure is not limited thereto.

VMEC values of all memory blocks included in the memory device 150 may be recorded in the VMEC table 146. That is, each of the memory blocks may have a VMEC value. A VMEC value means a limited erase count for a memory block. VMEC values may be determined when the memory device 150 is designed. If an erase count for a memory block exceeds a VMEC value, the reliability of data of the corresponding memory block may not be ensured.

Referring to FIG. 2, the VMEC value of a first memory block of a first die which is coupled to a first channel CH1 is 1000. The VMEC value of a first memory block of a second die which is coupled to the first channel CH1 is 2000. In other words, the first memory block of the second die which is coupled to the first channel CH1 may withstand a relatively higher erase count when compared to the first memory block of the first die coupled to the first channel CH1. Namely, the first memory block of the second die which is coupled to the first channel CH1 is superior in terms of durability than the first memory block of the first die coupled to the first channel CH1.

The VMEC value of a super block may be a VMEC value that is lowest among the VMEC values of memory blocks included in the super block. This is because, if reliability for any one memory block among the memory blocks included in the super block cannot be ensured, the super block cannot be properly utilized. Therefore, if the first memory block of the first die coupled to the first channel CH1 and the first memory block of the second die coupled to the first channel CH1 are configured together as one super block, the VMEC value of the configured super block is set to 1000. In this regard, a problem may be caused in that, while the first memory block of the second die has a relatively higher limited erase count than the first memory block of the first die, the first memory block of the second die may not be fully utilized because of the first memory block of the first die. According to an embodiment of the present invention, the processor 134 may prevent this problem by configuring each super block to include memory blocks which have relatively similar VMEC values.

Referring again to FIG. 1, the processor 134 may record the configured super blocks in a super block (SB) table 148. Hereinbelow, an example of the SB table 148 will be described with reference to FIG. 3.

FIG. 3 is a diagram illustrating a structure of the SB table 148 in accordance with an embodiment of the present invention disclosure. Similar to FIG. 2, first to fourth dies may be coupled to each of a plurality of channels and each die may include first to m^th memory blocks.

As described above, the processor 134 may configure super blocks based on the VMEC table 146 to ensure that each super block is made of memory blocks which have similar VMEC values. The processor 134 may record configured super blocks in the SB table 148 by recording the numbers of respective memory blocks included in each super block, in each SB index (super block index).

Hence, for example, referring to FIG. 3, in a first SB index of a first channel CH1, a first memory block of a first die, a first memory block of a second die, a first memory block of a third die and a first memory block of a fourth die are recorded. That is, according to the SB table 148, the first memory block of the first die, the first memory block of the second die, the first memory block of the third die and the first memory block of the fourth die may be configured as one super block by the processor 134.

By the same principle, according to the SB table 148, a second memory block of the first die, a second memory block of the second die, a second memory block of the third die and a second memory block of the fourth die may be configured as one super block by the processor 134.

The processor 134 may store the SB table 148 in the memory 144. Furthermore, the processor 134 may store the SB table 148 in the memory device 150 at a specific time. For example, when a system is shut down, the processor 134 may store the SB table 148 in the memory device 150. Then, when the system is booted up, the processor 134 may load the SB table 148 from the memory device 150, and store the loaded SB table 148 in the memory 144.

Referring back to FIG. 1, the controller 130 may perform an operation requested by the host 102 through the processor 134, which is realized as a microprocessor or a CPU. That is, the controller 130 may perform a command operation corresponding to a command received from the host 102. The controller 130 may perform a foreground operation as the command operation corresponding to the command received from the host 102. For example, the controller 130 may perform a program operation corresponding to a write command, a read operation corresponding to a read command, an erase operation corresponding to an erase command, and a parameter set operation corresponding to a set parameter command or a set feature command.

Although not shown in drawings, controller 130 may further include error correction code (ECC) component and power management unit (PMU).

The ECC component may detect and correct an error contained in the data read from the memory device 150. The ECC component may perform an error correction decoding process to the data read from the memory device 150 through an ECC code used during an ECC encoding process. According to a result of the error correction decoding process, the ECC component may output a signal, for example, an error correction success/fail signal. When the number of error bits is more than a threshold value of correctable error bits, the ECC component may not correct the error bits, and may output an error correction fail signal.

The ECC component may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component 138 is not limited to any specific structure. The ECC component may include all circuits, modules, systems or devices for error correction.

The PMU 140 may provide and manage power of the controller 130.

A memory device of the memory system in accordance with an embodiment of the present invention is described in detail with reference to FIGS. 4 to 6.

Figure 5:
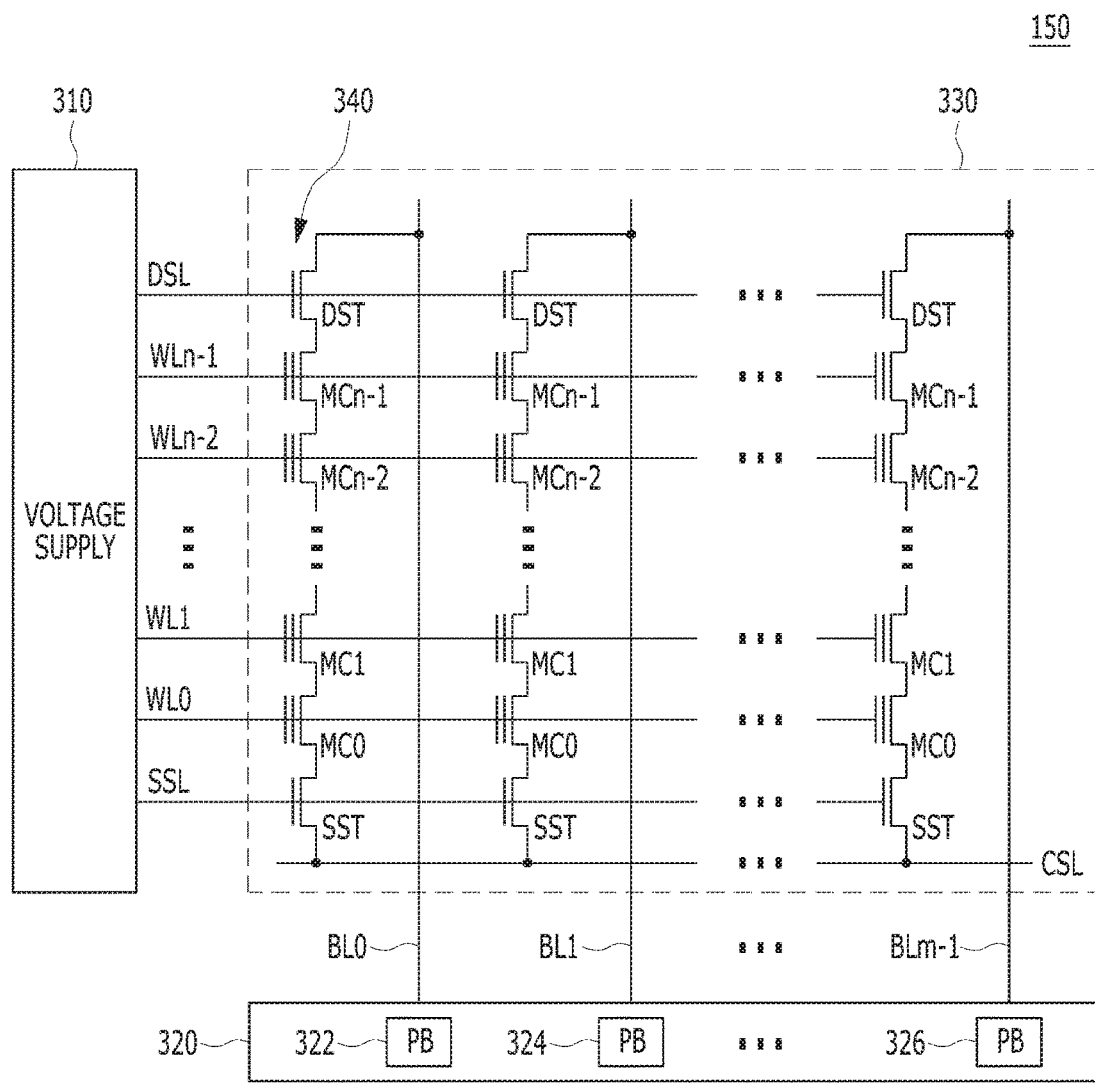
FIG. 5 is a circuit diagram illustrating a configuration of a memory cell array of a memory block in the memory device shown in FIG. 1, in accordance with an embodiment.
Figure 6:
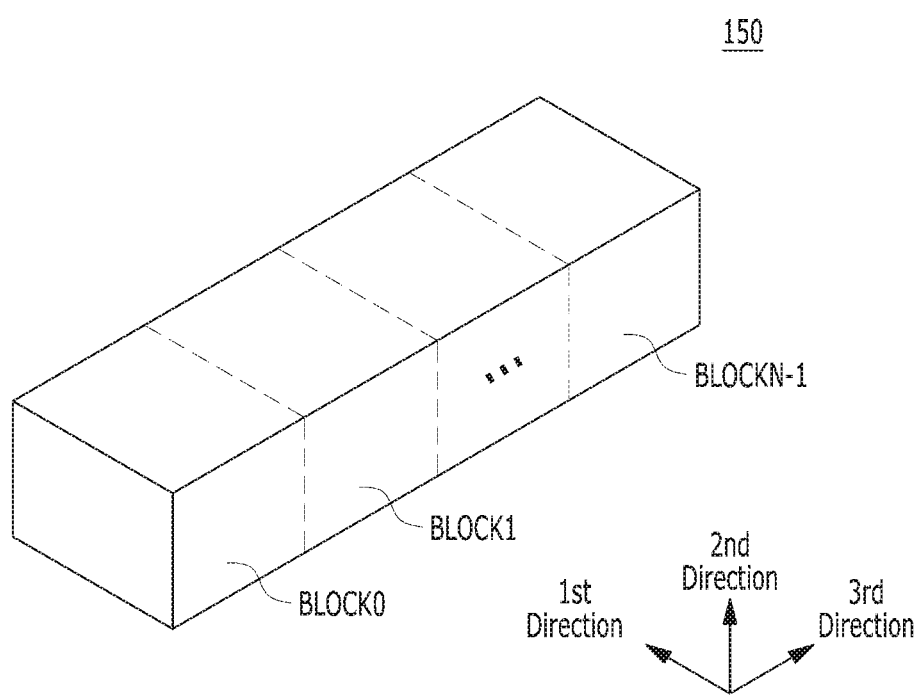
FIG. 6 is a block diagram illustrating a three-dimensional structure of the memory device shown in FIG. 4, in accordance with an embodiment.

FIG. 4 is a schematic diagram illustrating the memory device 150, FIG. 5 is a circuit diagram illustrating a configuration of a memory cell array of a memory block in the memory device 150, and FIG. 6 is a schematic diagram illustrating a 3D structure of the memory device 150.

Referring to FIG. 4, the memory device 150 may include a plurality of memory blocks BLOCK0 to BLOCKN−1, e.g., BLOCK0 (210), BLOCK1 (220), BLOCK2 (230), and to BLOCKN−1 (240). Each of the memory blocks 210, 220, 230 and 240 may include a plurality of pages, for example $2^M$ pages, the number of which may vary according to circuit design. For example in some applications, each of the memory blocks may include M pages. Each of the pages may include a plurality of memory cells that are coupled to a plurality of word lines WL.

Also, the memory device 150 may include a plurality of memory blocks, which may include a single level cell (SLC) memory block storing 1-bit data and/or a multi-level cell (MLC) memory block storing 2-bit data. The SLC memory blocks may include a plurality of pages that are realized by memory cells storing one-bit data in one memory cell. The SLC memory blocks may have a quick data operation performance and high durability. On the other hand, the MLC memory blocks may include a plurality of pages that are realized by memory cells storing multi-bit data, e.g., data of two or more bits, in one memory cell. The MLC memory blocks may have a greater data storing space than the SLC memory blocks. In other words, the MLC memory blocks may be highly integrated. Particularly, the memory device 150 may include not only the MLC memory blocks, each of which includes a plurality of pages that are realized by memory cells capable of storing two-bit data in one memory cell, but also triple level cell (TLC) memory blocks each of which includes a plurality of pages that are realized by memory cells capable of storing three-bit data in one memory cell, quadruple level cell (QLC) memory blocks each of which includes a plurality of pages that are realized by memory cells capable of storing four-bit data in one memory cell, and/or multiple level cell memory blocks each of which includes a plurality of pages that are realized by memory cells capable of storing five or more-bit data in one memory cell, and so forth.

In accordance with an embodiment of the present invention, the memory device 150 is described as a non-volatile memory, such as a flash memory, e.g., a NAND flash memory. However, the memory device 150 may be realized as any of a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-MRAM).

The memory blocks 210, 220, 230 and 240 may store the data transferred from the host 102 through a program operation, and transfer data stored therein to the host 102 through a read operation.

Referring to FIG. 5, a memory block 330, which may correspond to any of the plurality of memory blocks 210 to 240 included in the memory device 150 of the memory system 110, may include a plurality of cell strings 340 coupled to a plurality of corresponding bit lines BL0 to BLm−1. The cell string 340 of each column may include one or more drain select transistors DST and one or more ground select transistors GST. Between the drain and ground select transistors DST and GST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 5, the first cell string is coupled to the first bit line BL0, and the last cell string is coupled to the last bit line BLm−1. For reference, in FIG. 5, 'DSL' denotes a drain select line, 'GSL' denotes a ground select line, and 'CSL' denotes a common source line.

Although FIG. 5 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage, and a pass voltage to supply the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

The memory device 150 may be embodied by a two-dimensional (2D) or three-dimensional (3D) memory device. Particularly, as illustrated in FIG. 6, the memory device 150 may be embodied by a nonvolatile memory device having a 3D stack structure. When the memory device 150 has a 3D structure, the memory device 150 may include a plurality of memory blocks BLOCK0 to BLOCKN-1. FIG. 6 is a block diagram illustrating the memory blocks 210 to 240 of the memory device 150 shown in FIG. 1. Each of the memory blocks 210 to 240 may be realized in a 3D structure (or vertical structure). For example, the memory blocks 210 to 240 may be a three-dimensional structure with dimensions extending in first to third directions, e.g., an x-axis direction, a y-axis direction, and a z-axis direction.

Each memory block 330 included in the memory device 150 may include a plurality of NAND strings NS that are extended in the second direction, and a plurality of NAND strings NS (not shown) that are extended in the first direction and the third direction. Each of the NAND strings NS may be coupled to a bit line BL, at least one string selection line SSL, at least one ground selection line GSL, a plurality of word lines WL, at least one dummy word line DWL (not shown), and a common source line CSL, and each of the NAND strings NS may include a plurality of transistor structures TS (not shown).

In short, each memory block 330 among the memory blocks 210 to 240 of the memory device 150 may be coupled to a plurality of bit lines BL, a plurality of string selection lines SSL, a plurality of ground selection lines GSL, a plurality of word lines WL, a plurality of dummy word lines DWL, and a plurality of common source lines CSL, and each memory block 330 may include a plurality of NAND strings NS. Also, in each memory block 330, one bit line BL may be coupled to a plurality of NAND strings NS to realize a plurality of transistors in one NAND string NS. Also, a string selection transistor SST of each NAND string NS may be coupled to a corresponding bit line BL, and a ground selection transistor GST of each NAND string NS may be coupled to a common source line CSL. Memory cells MC may be provided between the string selection transistor SST and the ground selection transistor GST of each NAND string NS. That is, a plurality of memory cells may be realized in each memory block 330 of the memory blocks off the memory device 150.

Hereafter, an operation of configuring super blocks will be described with reference to FIGS. 7A and 7B.

Figure 7A:
FIG. 7A illustrates an operation of the memory system 110 in accordance with an embodiment of the present invention disclosure.

FIG. 7A illustrates an operation of the memory system 110 in accordance with an embodiment of the present invention disclosure. In particular, FIG. 7A shows the operation of configuring super blocks based on the VMEC values of the VMEC table 146.

For the sake of convenience, only a first channel CH1 will be considered in FIG. 7A, first to fourth dies are coupled to the first channel CH1 and each of a plurality of dies includes first to fifth memory blocks. Further, it is assumed, as an example, that VMEC values may include 1000, 2000 or 3000. Moreover, in this example, the processor 134 may configure preferentially memory blocks having low VMEC values as a super block, based on a memory block of the first die. However, this is nothing but a mere example, and it is to be noted that the disclosure is not limited thereto.

Referring to FIGS. 1 and 2, the processor 134 may configure super blocks based on the VMEC table 146. In order for efficient utilization of the memory device 150, the processor 134 may configure each super block by utilizing memory blocks which have relatively similar VMEC values.

Referring to FIG. 7A, for example, the VMEC value of the first memory block of the first die is 1000. The VMEC value of the fifth memory block of the second die is 1000, the VMEC value of the first memory block of the third die is 1000, and the VMEC value of the third memory block of the fourth die is 1000. The processor 134 may configure one super block by utilizing the first memory block of the first die, the fifth memory block of the second die, the first memory block of the third die and the third memory block of the fourth die, based on the VMEC table 146. The processor 134 may record the respective block numbers of the plurality of dies in a first SB index of the SB table 148. Hence, in this example, the VMEC value of the super block recorded in the first SB index is 1000.

For another example, the VMEC value of the fifth memory block of the first die is 1000. However, a memory block of which the VMEC value is 1000 does not exist among the remaining memory blocks of the second die. The processor 134 may select a memory block of which the VMEC value is 2000 which is relatively similar to 1000, among the remaining memory blocks of the second die which are not utilized yet to configure a super block. The VMEC value of the first memory block of the second die is 2000. The VMEC value of the second memory block of the third die is 1000, and the VMEC value of the fourth memory block of the fourth die is 1000. The processor 134 may configure one super block by utilizing the fifth memory block of the first die, the first memory block of the second die, the second memory block of the third die and the fourth memory block of the fourth die, based on the VMEC table 146. The processor 134 may record the respective block numbers of the plurality of dies in a second SB index of the SB table 148. Hence, in this example, the VMEC value of the super block recorded in the second SB index is 1000.

For another example, the VMEC value of the second memory block of the first die is 2000. The VMEC value of the second memory block of the second die is 2000. However, a memory block of which the VMEC value is 2000 does not exist among the remaining memory blocks of the third die. The processor 134 may select a memory block of which the VMEC value is 3000 which is relatively similar to 2000, among the remaining memory blocks of the third die which are not utilized yet to configure a super block. The VMEC value of the third memory block of the third die is 3000. The VMEC value of the fifth memory block of the fourth die is 2000. The processor 134 may configure one super block by utilizing the second memory block of the first die, the second memory block of the second die, the third memory block of the third die and the fifth memory block of the fourth die, based on the VMEC table 146. The processor 134 may record the respective block numbers of the plurality of dies in a third SB index of the SB table 148. The VMEC value of the super block recorded in the third SB index is 2000.

For still another example, the VMEC value of the fourth memory block of the first die is 2000. The VMEC value of the fourth memory block of the second die is 2000. However, a memory block of which the VMEC value is 2000 does not exist among the remaining memory blocks of the third die. The processor 134 may select a memory block of which the VMEC value is 3000 which is relatively similar to 2000, among the remaining memory blocks of the third die which are not utilized yet to configure a super block. The VMEC value of the fourth memory block of the third die is 3000. However, a memory block of which the VMEC value is 2000 does not exist among the remaining memory blocks of the fourth die. The processor 134 may select a memory block of which the VMEC value is relatively similar to 2000, among the remaining memory blocks of the fourth die which are not utilized yet to configure a super block. Among the remaining memory blocks of the fourth die which are not utilized yet to configure a super block, the second memory block of which the VMEC value is 1000 and the first memory block of which the VMEC value is 2000, exist. The processor 134 may preferentially select a memory block which has a relatively low VMEC value. That is, the processor 134 may select the fifth memory block of the fourth die. The processor 134 may configure one super block by utilizing the fourth memory block of the first die, the fourth memory block of the second die, the fourth memory block of the third die and the second memory block of the fourth die, based on the VMEC table 146. The processor 134 may record the respective block numbers of the plurality of dies in a fourth SB index of the SB table 148. The VMEC value of the super block recorded in the fourth SB index is 1000.

For yet still another example, the VMEC value of the third memory block of the first die is 3000. The VMEC value of the third memory block of the second die is 3000, the VMEC value of the fifth memory block of the third die is 3000, and the VMEC value of the first memory block of the fourth die is 3000. The processor 134 may configure one super block by utilizing the third memory block of the first die, the third memory block of the second die, the fifth memory block of the third die and the first memory block of the fourth die, based on the VMEC table 146. The processor 134 may record the respective block numbers of the plurality of dies in a fifth SB index of the SB table 148. The VMEC value of the super block recorded in the fifth SB index is 3000.

In the case where super blocks are configured by using only the same block numbers without using the VMEC table 146, the VMEC value of all the super blocks will be 1000. As a consequence, the memory system 110 in accordance with the embodiment of the disclosure may efficiently use the memory device 150 by utilizing the VMEC table 146.

Figure 7B:
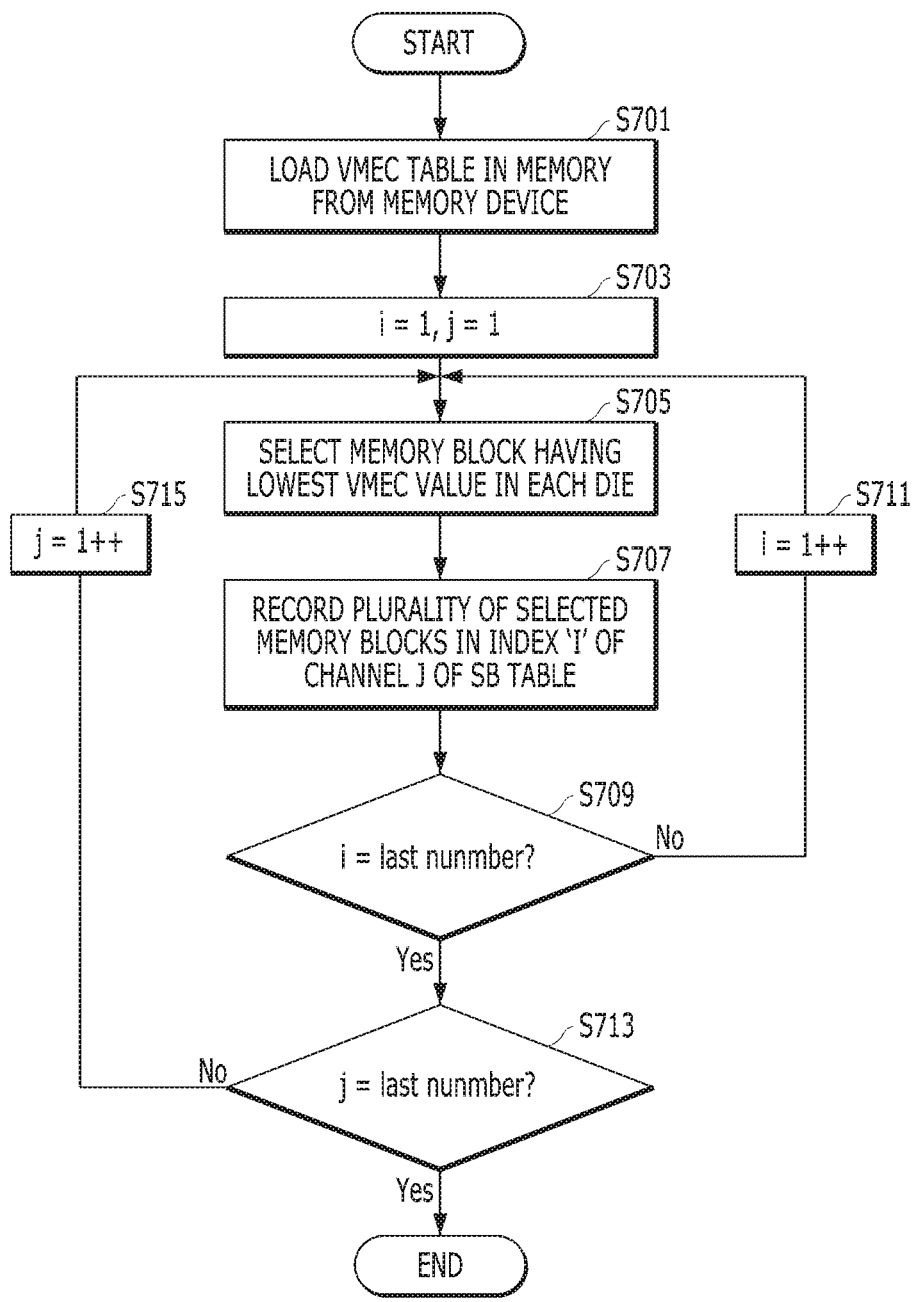
FIG. 7B is a flow chart of an operation process of the memory system 110 in accordance with an embodiment of the present invention disclosure.

FIG. 7B is a flow chart of the operation process of the memory system 110 in accordance with the embodiment of the present invention disclosure. In particular, FIG. 7B is a flow chart showing an operation process of configuring super blocks. For the sake of convenience, the processor 134 selects memory blocks of which the VMEC values are low, in order to configure a super block. Further, the processor 134 selects one memory block in each of a plurality of dies, to configure a super block.

First, at step S701, the processor 134 may load the VMEC table 146 stored in the memory device 150, into the memory 144.

At step S703, an initial value of a channel as a target for configuring super blocks and an initial value of an SB index may be set.

At step S705, the processor 134 may select memory blocks of which the VMEC values are lowest, among memory blocks which are included in the plurality of dies and are not utilized yet to configure a super block, based on the VMEC table 146.

At step S707, the processor 134 may record a plurality of selected memory blocks in an i^th SB index of the SB table 148.

At step S709, the processor 134 may check whether "i" is a last number. Namely, the processor 134 may check whether all super blocks for one channel are configured. For example, in the case where total "m" memory blocks are included in each of the plurality of dies, the last number of "i" is "m".

If "i" is not the last number (No at the step S709), at step S711, the value of "i" may be increased by 1. Then, the processor 134 may repeat the steps S705 to S709.

Conversely, if "i" is the last number (Yes at the step S709), at step S713, the processor 134 may check whether "j" is a last number. Namely, the processor 134 may check whether super blocks are all configured for all channels.

If "j" is not the last number (No at the step S713), at step S715, the value of "j" may be increased by 1. Then, the processor 134 may repeat the steps S705 to S713.

Conversely, if "j" is the last number (Yes at the step S713), the operation of the memory system 110 for configuring super blocks may be ended.

Hereunder, an operation of the memory system 110 for processing data by utilizing configured super blocks will be described with reference to FIGS. 8A and 8B.

Figure 8A:
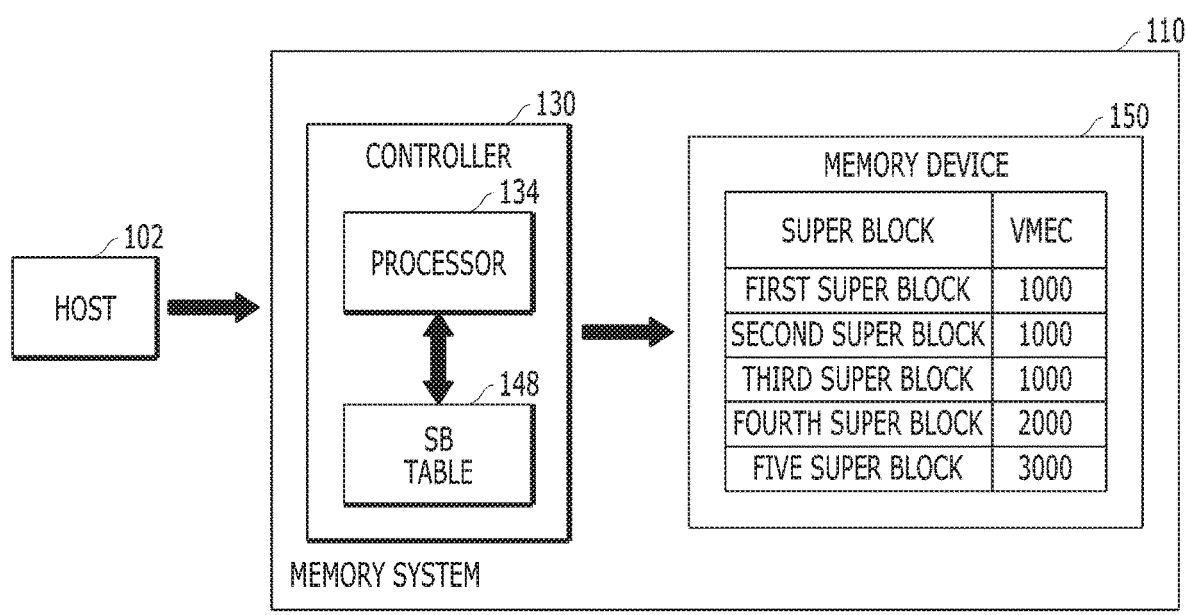
FIG. 8A is a diagram illustrating an operation of the data processing system 100 in accordance with an embodiment of the present invention disclosure.

FIG. 8A is a diagram illustrating an operation of the data processing system 100 in accordance with the embodiment of the present invention disclosure. For the sake of convenience, the super blocks configured in FIG. 7A will be utilized. The super blocks recorded in the first SB index to the fifth SB index will be referred to as a first super block to a fifth super block.

First, the host 102 may provide write data to the controller 130 together with a write command. Otherwise, the host 102 may provide a read command to the controller 130 to read target data from the memory device 150.

In the case where the controller 130 is provided with the write command, the processor 134 may temporarily store the data provided from the host 102, in the memory 144. Otherwise, in the case where the controller 130 is provided with the read command, the processor 134 may load data from the memory device 150 and temporarily store the data in the memory 144.

The processor 134 may determine the type of the data provided from the host 102. That is, the processor 134 may determine whether the data corresponding to the command provided from the host 102 is hot data or cold data. For example, the processor 134 may determine, as hot data, data of which the access count (e.g., a number of times of write and read operations for the data) by the host 102 per unit time is equal to or greater than a preset threshold value. Conversely, the processor 134 may determine, as cold data, data of which the access count by the host 102 per unit time is less than the preset threshold value. For another example, the processor 134 may determine, as hot data, data corresponding to an LBA of which the number of times of being provided from the host 102 is equal to or greater than a preset threshold value by referring to LBAs provided from the host 102. Conversely, the processor 134 may determine, as cold data, data corresponding to an LBA of which the number of times of being provided from the host 102 is less than the preset threshold value. However, this is nothing but a mere example, and it is to be noted that the disclosure is not limited thereto.

The processor 134 may process data by referring to the SB table 148, depending on the determined type of data. In detail, the processor 134 may store hot data preferentially in a super block of which the VMEC value is relatively high. Because hot data is relatively active in terms of movement thereof when compared to cold data, the hot data may be stored preferentially in a super block of which the VMEC value is high. Conversely, the processor 134 may store cold data preferentially in a super block of which the VMEC value is relatively low. Because cold data is relatively inactive in terms of movement thereof when compared to hot data, the cold data may be stored preferentially in a super block of which the VMEC value is low.

For example, in the case where a write command for hot data is provided to the controller 130 from the host 102, the processor 134 may store the hot data preferentially in a fifth super block. If data cannot be stored any more in the fifth super block, the processor 134 may store the hot data in a fourth super block. Furthermore, if data cannot be stored any more even in the fourth super block, the processor 134 may store the hot data in the memory blocks of at least one among a first super block to a third super block.

Conversely, in the case where a write command for cold data is provided to the controller 130 from the host 102, the processor 134 may store the cold data preferentially in the memory blocks of at least one among the first to third super blocks. If data cannot be stored any more in the first to third super blocks, the processor 134 may store the cold data in the fourth super block. Furthermore, if data cannot be stored any more even in the fourth super block, the processor 134 may store the cold data in the fifth super block.

Moreover, in the case where movement of data occurs by a background operation, hot data may be stored preferentially in a super block of which the VMEC value is relatively high, and cold data may be stored preferentially in a super block of which the VMEC value is relatively low. For example, in the case where the fifth super block which is full of data has an empty space due to garbage collection, hot data stored in the fourth super block may be moved to the fifth super block. Conversely, in the case where the first to third super blocks which are full of data have an empty space due to garbage collection, cold data stored in the fifth super block may be moved to the memory blocks of at least one among the first to third super blocks. However, this is nothing but a mere example, and it is to be noted that the disclosure is not limited thereto.

FIG. 8B is a flow chart of the operation process of the data processing system 100 in accordance with the embodiment of the present invention disclosure. In FIG. 8B, the host 102 provides a write command to the memory system 110.

First, at step S801, the host 102 may provide write data to the memory system 110 together with a write command.

At step S803, the processor 134 in the memory system 110 may determine the type of the data provided from the host 102. That is, the processor 134 may determine whether the data provided from the host 102 is hot data or cold data.

If the write data provided from the host 102 is cold data (No at the step S805), at step S807, the processor 134 may store the cold data preferentially in a super block of which the VMEC value is relatively low.

Conversely, if the write data provided from the host 102 is hot data (Yes at the step S805), at step S809, the processor 134 may store the hot data preferentially in a super block of which the VMEC value is relatively high.

Then, at step S811, the memory system 110 may provide a storage completion signal for the write data, to the host 102.

FIGS. 9 to 17 are diagrams schematically illustrating application examples of the data processing system of FIGS. 1 to 8 according to various embodiments.

Figure 9:
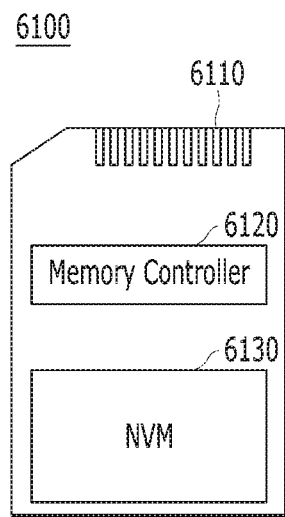
FIGS. 9 to 17 are diagrams schematically illustrating application examples of a data processing system, in accordance with various embodiments of the present invention.

FIG. 9 is a diagram schematically illustrating the data processing system including the memory system in accordance with an embodiment. FIG. 9 schematically illustrates a memory card system 6100 to which the memory system in accordance with an embodiment is applied.

Referring to FIG. 9, the memory card system 6100 may include a memory controller 6120, a memory device 6130 and a connector 6110.

Specifically, the memory controller 6120 may be connected to the memory device 6130 embodied by a nonvolatile memory (NVM), and configured to access the memory device 6130. For example, the memory controller 6120 may be configured to control read, write, erase, and background operations of the memory device 6130. The memory controller 6120 may be configured to provide an interface between the memory device 6130 and a host (not shown), and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, as shown in FIG. 1, the memory controller 6120 may include a random access memory (RAM), a processor, a host interface, a memory interface, and an error correction component.

The memory controller 6120 may communicate with an external device, for example the host 102 of FIG. 1, through the connector 6110. For example, as described with reference to FIG. 1, the memory controller 6120 may be configured to communicate with an external device through one or more various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and Bluetooth. Thus, the memory system and the data processing system in accordance with an embodiment may be applied to wired and/or wireless electronic devices, particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may be integrated to form a solid-state driver (SSD). Also, the memory controller 6120 and the memory device 6130 may form a memory card such as a PC card (e.g., Personal Computer Memory Card International Association (PCMCIA)), a compact flash (CF) card, a smart media card (e.g., SM and SMC), a memory stick, a multimedia card (e.g., MMC, RS-MMC, MMCmicro and eMMC), an secured digital (SD) card (e.g., SD, miniSD, microSD and SDHC) and a universal flash storage (UFS).

Figure 10:
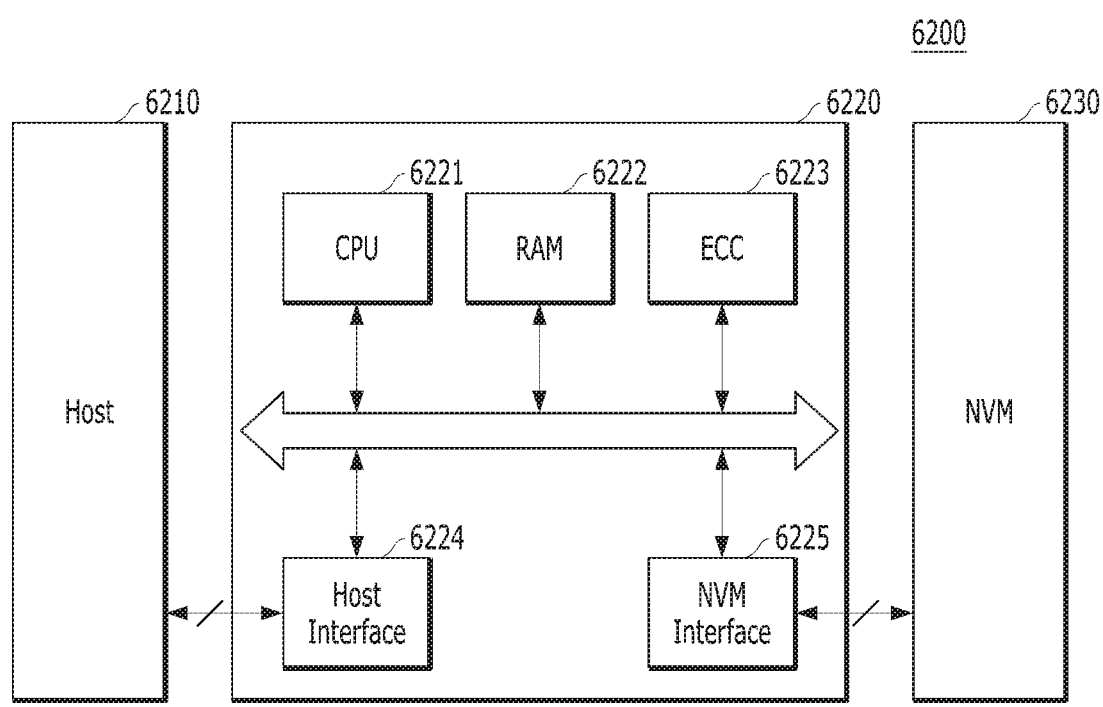

FIG. 10 is a diagram schematically illustrating a data processing system 6200 including the memory system in accordance with an embodiment.

Referring to FIG. 10, the data processing system 6200 may include a memory device 6230 having one or more nonvolatile memories (NVMs) and a memory controller 6220 for controlling the memory device 6230. The data processing system 6200 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request from the host 6210, and the memory controller 6220 may include one or more central processing units (CPUs) 6221, a buffer memory such as a random access memory (RAM) 6222, an error correction code (ECC) circuit 6223, a host interface 6224 and a memory interface such as an NVM interface 6225.

The CPU 6221 may control overall operations on the memory device 6230, for example, read, write, file system management, and bad page management operations. The RAM 6222 may be operated according to control of the CPU 6221, and used as a work memory, buffer memory, or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC component of the controller 130. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using Low Density Parity Check (LDPC) code, Bose-Chaudhri-Hocquenghem (BCH) code, turbo code, Reed-Solomon code, convolution code, Recursive Systematic Code (RSC) or coded modulation such as Trellis-Coded Modulation (TCM) or Block coded modulation (BCM).

The memory controller 6220 may transmit and/or receive data to and/or from the host 6210 through the host interface 6224, and transmit/receive data to/from the memory device 6230 through the NVM interface 6225. The host interface 6224 may be connected to the host 6210 through a parallel advanced technology attachment (PATA) bus, serial advanced technology attachment (SATA) bus, small computer system interface (SCSI), universal serial bus (USB), peripheral component interconnect-express (PCIe) or NAND interface. The memory controller 6220 may have a wireless communication function with a mobile communication protocol such as wireless fidelity (WiFi) or Long Term Evolution (LTE). The memory controller 6220 may be connected to an external device, for example, the host 6210 or another external device, and then transmit and/or receive data to and/or from the external device. In particular, as the memory controller 6220 is configured to communicate with the external device through one or more of various communication protocols, the memory system and the data processing system in accordance with an embodiment may be applied to wired and/or wireless electronic devices, particularly a mobile electronic device.

Figure 11:
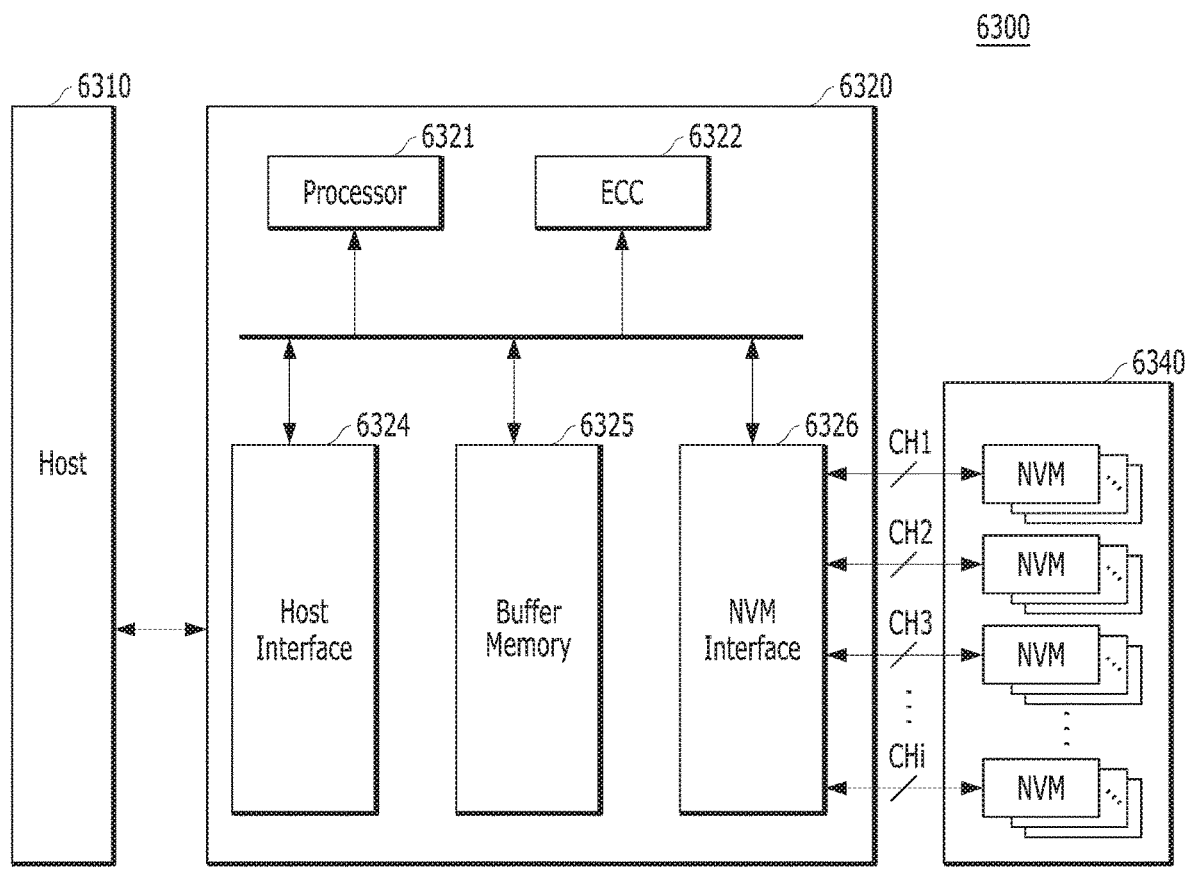

FIG. 11 is a diagram schematically illustrating another example of the data processing system including the memory system in accordance with an embodiment. FIG. 11 schematically illustrates a solid state drive (SSD) 6300 to which the memory system may be applied.

Referring to FIG. 11, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as dynamic random access memory (DRAM), synchronous DRAM (SDRAM), double data rate (DDR) SDRAM, low power DDR (LPDDR) SDRAM and graphics RAM (GRAM) or nonvolatile memories such as ferroelectric RAM (FRAM), resistive RAM (RRAM or ReRAM), spin-transfer torque magnetic RAM (STT-MRAM) and phase-change RAM (PRAM). For convenience of description, FIG. 10 illustrates that the buffer memory 6325 exists in the controller 6320. However, the buffer memory 6325 may exist outside the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
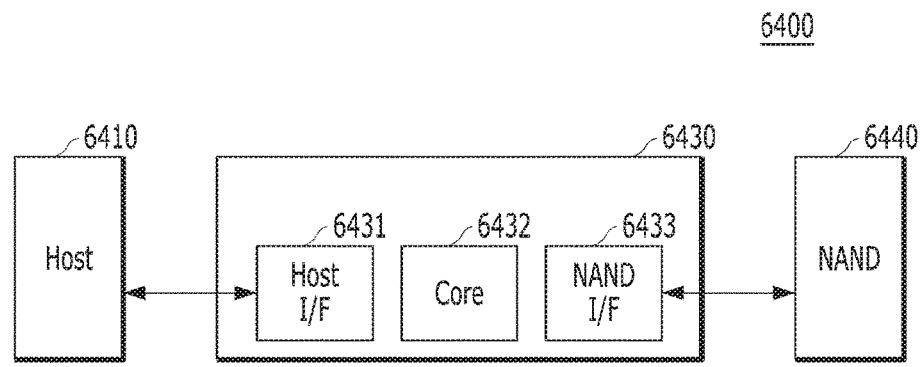

FIG. 12 is a diagram schematically illustrating another example of the data processing system including the memory system in accordance with an embodiment. FIG. 12 schematically illustrates an embedded Multi-Media Card (eMMC) 6400 to which the memory system may be applied.

Referring to FIG. 12, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

Specifically, the controller 6430 may be connected to the memory device 6440 through a plurality of channels. The controller 6430 may include one or more cores 6432, a host interface (I/F) 6431 and a memory interface, for example, a NAND interface (I/F) 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS)-I and UHS-II interface.

FIGS. 13 to 16 are diagrams schematically illustrating other examples of the data processing system including the memory system in accordance with one or more embodiments. FIGS. 13 to 16 schematically illustrate universal flash storage (UFS) systems to which the memory system may be applied.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired and/or wireless electronic devices, particularly mobile electronic devices, and the UFS devices 6520, 6620, 6720 and 6820 may serve as embedded UFS devices. The UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices, particularly mobile electronic devices, through UFS protocols. The UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, universal storage bus (USB) Flash Drives (UFDs), multi-media card (MMC), secure digital (SD), mini-SD, and micro-SD.

Figure 13:
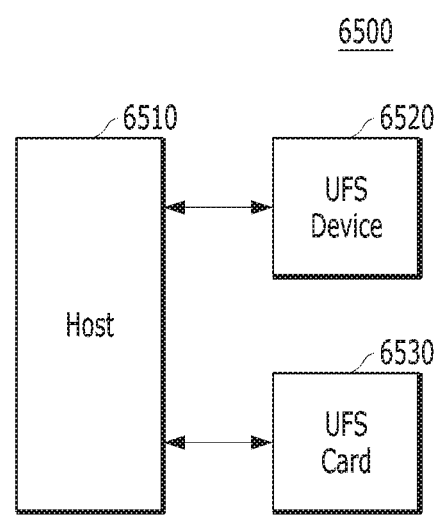

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In an embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6510, and a plurality of UFS cards may be connected in parallel or in the form of a star to the UFS device 6520 or connected in series or in the form of a chain to the UFS device 6520.

Figure 14:
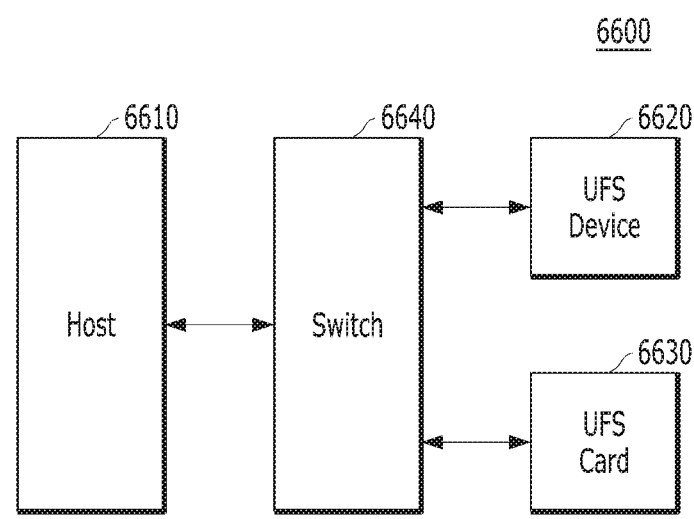

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In an embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 15:
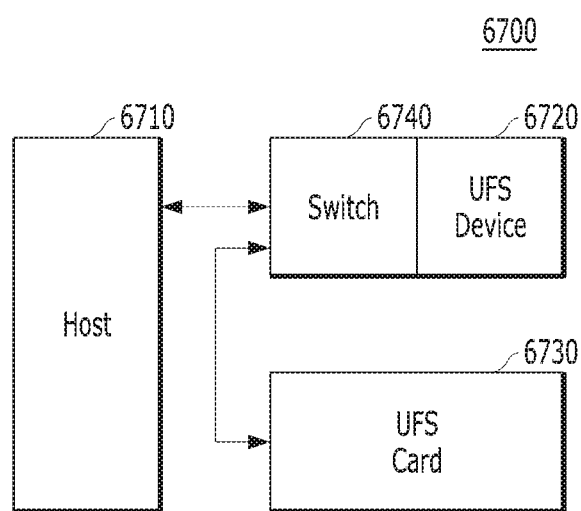

In the UFS system 6700 illustrated in FIG. 15, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In an embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710, or connected in series or in the form of a chain to each other. Furthermore, a plurality of UFS cards may be connected in parallel or in the form of a star to the UFS device 6720.

Figure 16:
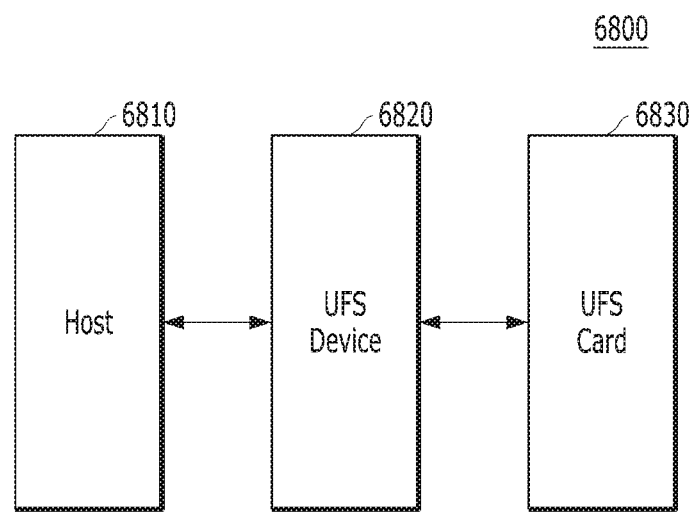

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810, and the M-PHY and UniPro module for communication with the UFS card 6830, for example, through a target Identifier (ID) switching operation. The host 6810 and the UFS card 6830 may communicate with each other through target ID switching between the M-PHY and UniPro modules of the UFS device 6820. In an embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
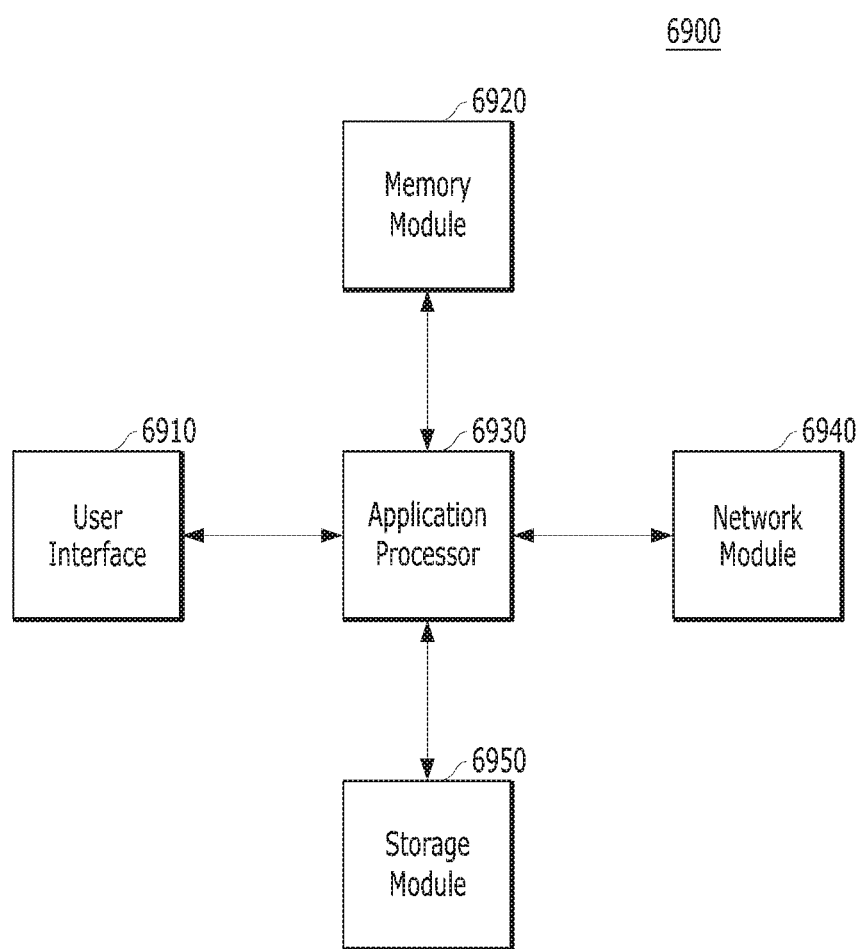

FIG. 17 is a diagram schematically illustrating another example of the data processing system including the memory system in accordance with an embodiment. FIG. 17 is a diagram schematically illustrating a user system 6900 to which the memory system may be applied.

Referring to FIG. 17, the user system 6900 may include a user interface 6910, a memory module 6920, an application processor 6930, a network module 6940, and a storage module 6950.

Specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR3 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 10 to 15.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the processor 6930 on a display/touch module of the mobile electronic device, or support a function of receiving data from the touch panel.

According to embodiments of the present invention, a memory system and an operating method of the memory system are capable of processing data with a memory device quickly and stably by minimizing the complexity and performance deterioration of the memory system and maximizing the utility efficiency of the memory device.

While the present invention has been described with respect to specific embodiments, it will be apparent to those skilled in the art in light of this disclosure that various changes and modifications may be made without departing from the spirit and scope of the invention as defined in the following claims.

What is claimed is:

1. A memory system comprising:
   a memory device including a plurality of source dies, wherein each of the plurality of source dies includes a plurality of memory blocks, and the memory device storing memory block durability values each of which is uniquely determined for each of the plurality of memory blocks when the memory device is designed;
   a memory storing the memory block durability values loaded from the memory device; and
   a processor configured to select a first memory block having a first memory block durability value from a first die among the plurality of source blocks, select a second memory block from a second die among the plurality of source dies, the second memory block having a second memory block durability value which is closest to the first memory block durability value among other memory block durability values of other memory blocks included in the second die when there is no memory block having a same value as the first memory block durability value in the second die, generate a super block including the first memory block and the second memory block, determine a super block durability value of the super block based on a lowest one of the first memory block durability value and the second memory block durability value, and allocate the super block for storing target data based on the super block durability value,
   wherein the memory durability values include a variable max erase count (VMEC).

2. The memory system according to claim 1, wherein the processor stores the super block durability value in the memory.

3. The memory system according to claim 1, wherein the processor processes the target data by utilizing the selected super block.

4. The memory system according to claim 1, wherein the processor determines a type of target data, and stores the target data in the memory device depending on the type of the target data.

5. The memory system according to claim 4, wherein the processor stores the target data, which is hot data, preferentially in a super block which has a relatively high super block durability value by referring to the memory.

6. The memory system according to claim 4, wherein the processor stores the target data, which is cold data, preferentially in a super block which has a relatively low super block durability value by referring to the memory.

7. The memory system according to claim 4, wherein the processor determines a type of the target data based on an access count by a command corresponding to the target data per unit time.

8. The memory system according to claim 4, wherein the processor determines a type of the target data based on a number of times by which a logical block address (LBA) corresponding to the target data is provided.

9. The memory system according to claim 1, wherein the processor is further configured to, when there is a memory block having the same value as the first memory block durability value in the second memory block, select the memory block as the second memory block from the second die among the plurality of source dies.

10. The memory system according to claim 1, wherein the first memory block durability value is the lowest among other memory block durability values in the first die among the plurality of source blocks.

11. A method for operating a memory system including a memory device including a plurality of source dies, wherein each of the plurality of source dies includes a plurality of memory blocks, the method comprising:
    loading memory block durability values from the memory device, wherein each of the memory block durability values is uniquely determined for each of the plurality of memory blocks when the memory device is designed;
    selecting a first memory block having a first memory block durability value from a first die among the plurality of source dies;
    selecting a second memory block from a second die among the plurality of source dies, wherein the second memory block has a second memory block durability value which is closest to the first memory block durability value among other memory block durability of values of other memory blocks included in the second die when there is no memory block having a same value as the first memory block durability value in the second die;
    generate a super block inducing the first memory block and the second memory block;
    determining a super block durability value of the super block based on a lowest one of the first memory block durability value and the second memory block durability value; and
    allocating the super block for storing target data based on the super block durability value,
    wherein the memory durability values include a variable max erase count (VMEC).

12. The method according to claim 11, further comprising storing the super block durability value in a memory included in the memory system.

13. The method according to claim 11, further comprising:
    when there is a memory block having the same value as the first memory block durability value in the second memory block, selecting the memory block as the second memory block from the second die among the plurality of source dies.

14. The method according to claim 11, further comprising:
    processing target data by utilizing the configured super block.

15. The method according to claim 14, wherein the processing of the target data comprises:
    determining a type of the target data; and
    storing the target data in the memory device based on the type of the target data.

16. The method according to claim 15,
    wherein the target data is hot data, and
    wherein the storing of the target data stores the target data preferentially in a super block which has a relatively high super block durability value.

17. The method according to claim 15,
    wherein the target data is cold data, and
    wherein the storing of the target data stores the target data preferentially in a super block which has a relatively low super block durability value.

18. The method according to claim 15, wherein the determining of the type of the target data determines the type of the target data based on an access count by a command corresponding to the target data per unit time.

19. The method according to claim 15, wherein the determining of the type of the target data determines the type of the target data based on a number of times by which a logical block address (LBA) corresponding to the target data is provided.

20. A memory system comprising:
a plurality of memory dies, each memory die including plural memory blocks, each memory block having a memory block durability value determined when the memory device is designed;
a memory storing memory block durability values loaded from the plurality of memory dies; and
a controller configured to select a first memory block having a first memory block durability value from a first die among the plurality of source blocks, select a second memory block from a second die among the plurality of source dies, the second memory block having a second memory block durability value which is closest to the first memory block durability value among other memory block durability values of other memory blocks included in the second die when there is no memory block having a same value as the first memory block durability value in the second die, generate a super block including the first memory block and the second memory block, determine a super block durability value of the super block based on a lowest one of the first memory block durability value and the second memory block durability value, and allocate the super block for storing target data based on the super block durability value,
wherein the memory durability values include a variable max erase count (VMEC).

21. The memory system according to claim 20, wherein the controller is further configured to, when there is a memory block having the same value as the first memory block durability value in the second memory block, select the memory block as the second memory block from the second die among the plurality of source dies.

* * * * *